United States Patent [19]

Heyring

[11] Patent Number: 5,556,115
[45] Date of Patent: Sep. 17, 1996

[54] VEHICLE SUSPENSION SYSTEMS

[75] Inventor: Christopher B. Heyring, Dunsborough, Australia

[73] Assignee: Kinetic Limited, Western Australia, Australia

[21] Appl. No.: 307,582

[22] PCT Filed: Apr. 2, 1993

[86] PCT No.: PCT/AU93/00147

§ 371 Date: Sep. 27, 1994

§ 102(e) Date: Sep. 27, 1994

[87] PCT Pub. No.: WO93/19945

PCT Pub. Date: Oct. 14, 1993

[30] Foreign Application Priority Data

Apr. 2, 1992 [AU] Australia .................. PL1698

[51] Int. Cl.⁶ .................................. B60S 9/20
[52] U.S. Cl. ................ 280/6.12; 280/698; 280/709
[58] Field of Search ................... 280/6.11, 6.12, 280/703, 707, 709, 714, 697, 698, DIG. 1

[56] References Cited

U.S. PATENT DOCUMENTS

| | | |
|---|---|---|
| 1,847,252 | 3/1932 | Miller . |
| 2,914,338 | 11/1959 | Kress . |
| 3,477,733 | 11/1969 | Gottschalk . |
| 3,884,496 | 5/1975 | Ito et al. . |
| 4,257,618 | 3/1981 | Tax et al. ......................... 280/6.11 |
| 4,667,978 | 5/1987 | Asami et al. ................. 280/6.11 X |
| 4,787,644 | 11/1988 | Yokote et al. . |
| 4,856,798 | 8/1989 | Buma et al. . |
| 4,869,528 | 9/1989 | Buma et al. . |
| 4,965,878 | 10/1990 | Yamagiwa et al. . |
| 4,970,645 | 11/1990 | Adachi et al. . |
| 4,999,777 | 3/1991 | Schussler et al. . |
| 5,014,199 | 5/1991 | Konishi et al. ............... 280/DIG. 1 X |
| 5,085,460 | 2/1992 | Takahashi ..................... 280/DIG. 1 X |
| 5,116,077 | 5/1992 | Karnopp et al. . |

FOREIGN PATENT DOCUMENTS

| | | |
|---|---|---|
| 33881/68 | 8/1969 | Australia . |
| 41870/68 | 2/1970 | Australia . |
| 61262/69 | 3/1971 | Australia . |
| 949761 | 9/1949 | France . |
| 1256864 | 5/1959 | France . |
| 1190212 | 4/1970 | Germany . |
| 3032911 | 2/1991 | Japan . |
| 810644 | 3/1959 | United Kingdom . |
| 91/04877 | 4/1991 | WIPO . |

*Primary Examiner*—Lee Young

[57] ABSTRACT

A vehicle suspension system includes a vehicle body, a plurality of wheels arranged in lateral and longitudinal spaced relation to support the vehicle body. Two hydraulic rams are between each wheel and the vehicle body, with one ram of each wheel connected by a fluid circuit with a ram of the laterally adjacent wheel and the other ram of each wheel connected by a fluid circuit to the ram of the longitudinally adjacent wheel. A respective sensor for each wheel is adapted to generate a signal indicative of the positional relation of that wheel relative to the vehicle body. A programmed controller is arranged to receive the signals from each sensor and compare the positional relation of the body with respect to a preset datum position, and a fluid adjustment device is operable in respect to a detected variation of the positional relation from the datum position to adjust the volume of fluid in the relevant fluid circuit to correct the positional relation if required.

18 Claims, 4 Drawing Sheets

VEHICLE SUSPENSION SYSTEMS

This invention relates to improvements in the suspension system for a vehicle, and is specifically related to controlling the disposition of the vehicle body relative to the vehicle wheels when the vehicle is subject to load distribution variation.

In recent times there has been a trend towards resilient sprung suspension systems incorporating variable damping and spring rates in an attempt to improve vehicle stability and reduce movement of the vehicle body relative to the surface being traversed. Some other more advanced suspension systems, commonly referred to as active and semi-active suspensions, incorporate a number of electronic sensors which monitor information such as vertical wheel travel and body roll, as well as speed, acceleration, steering and braking commands. This and other data is processed by a computer which instructs hydraulic or pneumatic actuators to override the normal function of resilient springs in order to interpret, compensate and adjust the suspensions performance to suit speed, terrain and other factors in order to maintain a level ride and controlled distribution of weight onto all wheels. These suspension systems require an external intelligent back-up system, and call for substantial input of external energy, drawn from the vehicle engine, to operate the actuators that affect the adjustment to the suspension system.

A range of constructions of 'active' and 'semi-active' suspensions for vehicles have been proposed including systems operating on the basis of compression and/or displacement of fluids and such systems currently in use incorporate a pump to maintain the working fluid at the required pressure and effect the high speed distribution thereof, and sophisticated control mechanisms to regulate the operation of the suspension system in accordance with sensed road and/or vehicle operating conditions. These known systems incorporating pumps and electronic control systems, which are both required to operate substantially continuously while the vehicle is in operation, are comparatively expensive to construct and maintain, and require energy input, and therefore have limited acceptability in the vehicle industry.

There is disclosed in International Patent Application No. WO91/04877, a vehicle having a load support body, and a pair of front ground engaging wheels and a pair of rear ground engaging wheels connected to the body to support the body and wherein each wheel is displaceable relative to the body in a generally vertical direction.

Interconnected between each wheel and the body is a fluid ram including first and second fluid filled chambers that varies in volume in response to vertical movement between the respective wheel and the body.

The first chambers of the front and rear wheels on each side of the vehicle are in communication by respective individual first fluid circuits. Similarly the second chambers of the front wheels and of the rear wheels respectively are in communication by respective individual second fluid circuits. This construction provides, when the vehicle is in use, substantially the same fluid pressure in the two chambers of any individual fluid circuit thereby inducing all wheels to maintain tractive ground engagement.

In practice at least one and preferably each of said individual fluid circuits include at least one pressure accumulator, and preferably also a damping device operable to at least partially dissipate pressure shock in the fluid circuit. The vehicle suspension above described differs greatly from all the known systems in that the wheel travel is not dependent upon progressive resilient suspension mechanisms which require variable reactions to the many ever changing conditions experienced by the vehicle. This allows free vertical travel of the individual wheels with respect to the vehicle body or chassis without having to first overcome the resistance of the conventional springing mechanisms normally incorporated between the wheels and the vehicle body. Thus, the wheels are individually unrestrained and free to move to follow the undulations of the surface being travelled without continually changing the vehicle weight distribution between the individual wheels. This reduction or elimination of changes in weight distribution significantly improves the traction between the wheels and the surface being traversed and the handling characteristics of the vehicle.

A further development of the above described suspension system is disclosed in International Patent Application No. WO 93/01063.

It will be appreciated, that in order for the hydraulic system, as disclosed in the previously referred to prior patent application, to function correctly, the relative pressures and fluid volumes of the individual circuits must be correlated, so that each circuit can perform its specific functions, without interference from circuits which share the weight supporting function of the same wheel. In this regard it will be appreciated that if the front and rear fluid circuits are each initially supplied with too much fluid these circuits will become over pressurised relatively to the two side circuits. The side circuits will thereby be relieved of some of the vehicles weight and the vehicle is principally supported by the front and rear circuits. A typical consequence of this will be that the gas volumes in the side circuits accumulators become expanded beyond their optimum working sizes and this in turn permits excessive roll motions to occur when cornering.

Alternatively the side circuits may be provided with too much fluid with reference to the front and back circuits and the resultant pressure/volume imbalance leads to the side circuits carrying more of the vehicles weight than intended and consequentially excessive pitch motion would result. Not only does such imbalance affect the ride quality but it would also render the vehicle less safe as the wheels would not all be carrying the correct proportion of the total loads and not reacting to different driving conditions properly.

Additionally most vehicles are non-symmetrically loaded for a large portion of the operating time, and indeed, an engine mounted at the front usually makes the front wheels carry more weight than the back. If the side circuits of such an eccentrically loaded vehicle are permitted to carry too much of the total weight then the vehicle will tend to pivot on the support of the side circuits and will pitch forwards onto the front wheels thereby further reducing the optimum weight being born on the rear wheels.

Similarly, in a vehicle that may be subjected to a large load being suddenly applied at the rear, this can disturb the equilibrium of the relative pressures and volumes so that the front circuit may even become negatively loaded when the side circuits carry more than their share of weight.

It is therefore the object of this invention to provide a vehicle suspension system which determines changes in the vehicular height and inclination and adjusts the fluid in appropriate circuits to reinstate or rectify the optimum relative heights, while providing the optimum load distribution to the wheels.

With this object in view, there is provided a vehicle suspension system comprising a plurality of wheel assemblies arranged in longitudinal and lateral spaced relation to a vehicle body, each wheel assembly including a wheel and two fluid rams each operably connecting the wheel to the vehicle body to support the vehicle body, one fluid ram of each two laterally spaced wheel assemblies being in direct fluid communication by a fluid conduit, and the other fluid ram of each said two laterally spaced wheel assemblies being in direct fluid communication with a respective fluid ram of a wheel assembly longitudinally spaced therefrom on the same side of the vehicle, sensor means adapted to generate signals indicative of the positional relations of each of said laterally and longitudinally spaced wheels relative to the vehicle body, control means arranged to receive said signals and compare said positional relations with a respective preset datum position, and adjustment means operable in response to variation of the positional relation of each wheel from the respective datum position beyond a preset limit to adjust the volume of fluid in the fluid circuits to establish a positional relation within said preset limit.

In one form of the suspension system, each of the fluid ram means between the wheels and the vehicle body includes two single acting fluid rams arranged to expand and contract together as a result of relative movement between the wheel and the vehicle body. One fluid ram of each of the two front wheels are in direct communication by a fluid conduit and one cylinder of each of the two rear wheels are similarly in direct communication by a further fluid conduit. The remaining fluid rams at the front and rear wheels on each side of the vehicle are in direct communication by a respective fluid conduit. Thus, if the vehicle body moves down with respect to the wheel at the front left hand corner, fluid is displaced from each fluid ram of that wheel to the cylinder of the right front wheel and the left rear wheel respectively, to effect an equal and opposite movement of the vehicle body relative to the wheels.

Preferably, the fluid ram of each two wheel assemblies which are longitudinally spaced are double acting fluid rams, each having upper and lower chambers, said double acting fluid rams having the respective upper chambers thereof in direct fluid communication and the respective lower chambers thereof in direct fluid communication by respective upper and lower longitudinal conduits, the upper conduits on the respective sides of the vehicle being in direct fluid comunication with the lower conduit on the opposite side of the vehicle.

Alternatively, or in addition, the fluid ram of each two wheel assemblies which are laterally spaced are double acting fluid rams having upper and lower chambers, said double acting rams of the laterally spaced wheel assemblies having the respective upper chambers thereof in direct fluid communication and the respective lower chambers thereof in direct fluid communication by respective upper and lower lateral conduits, said upper lateral conduits on the respective ends of the vehicle being in direct fluid communication with the lower conduit at the opposite end of the vehicle.

In yet a further alternative construction, the fluid rams of each two longitudinally spaced wheel assemblies are each double acting fluid rams having respective upper and lower fluid chambers, the upper and lower chambers of the two longitudinally spaced fluid rams on one side of the vehicle being in fluid communication upper chamber to upper chamber and lower chamber to lower chamber, and the upper and lower chambers of the two longitudinally spaced fluid rams on the opposite side of the vehicle are correspondingly in fluid communication.

In the absence of pressure accumulators in the circuits, the volume of fluid in each of the conduits and the two fluid rams connected thereto remains the same under all operating conditions, barring leakage. Accordingly, if there is a difference in the extent of movement of one fluid ram in relation to the other fluid ram connected thereto by a fluid conduit, this indicates a change in the volume of fluid in the total assembly comprising the two cylinders and the connecting conduit.

However, in prior art suspension systems of the general type previously referred to, it is conventional practice to provide in each fluid conduit a pressure accumulator to establish a degree of resilience within the fluid circuit, and hence in the suspension system. Accordingly, as the total weight of the vehicle body varies, such as, as a result of adding or removing people or load from the vehicle body, the pressure in the fluid circuits will vary resulting in a variation in the volume of hydraulic fluid in the accumulators.

Thus, if accumulators are similarly incorporated in the suspension system as presently proposed, the quantity of the fluid in the accumulator may vary with variations in operating conditions thus resulting in a variation in the actual amount of fluid in the circuit, excluding the amount of fluid in the accumulator, resulting in a lowering of the body with respect to the wheels. This will result in the signals from the positional sensor communicating to the control means, a lowering of the operating height of the vehicle body. When such conditions are detected by the control means, the latter initiates operation of a pump and actuates the appropriate valves to supply further fluid to that circuit to return the vehicle body to its normal operating height. Upon subsequent removal of the additional load, the resulting reduction in pressure in the fluid system will result in the return of fluid from the accumulator to the fluid circuit and necessitate the draining of fluid from the circuit to a reservoir to again establish the nominal correct height of the vehicle body with respect to the wheels.

In the alternative form of the suspension, as previously referred to wherein the two single acting cylinders provided between each wheel and the vehicle body, are replaced by two double acting fluid cylinders, the fluid in the upper chamber of each cylinder supports the vehicle weight. Further, only one position sensing means for each wheel assembly is required and the signals therefrom received by the control means will control the volume of fluid in the circuit connecting these upper chambers.

The invention will be more readily understood from the following description of a number of specific constructions of vehicle suspension systems incorporating the feature of the invention, and as illustrated in the accompanying drawings.

Figure 1:
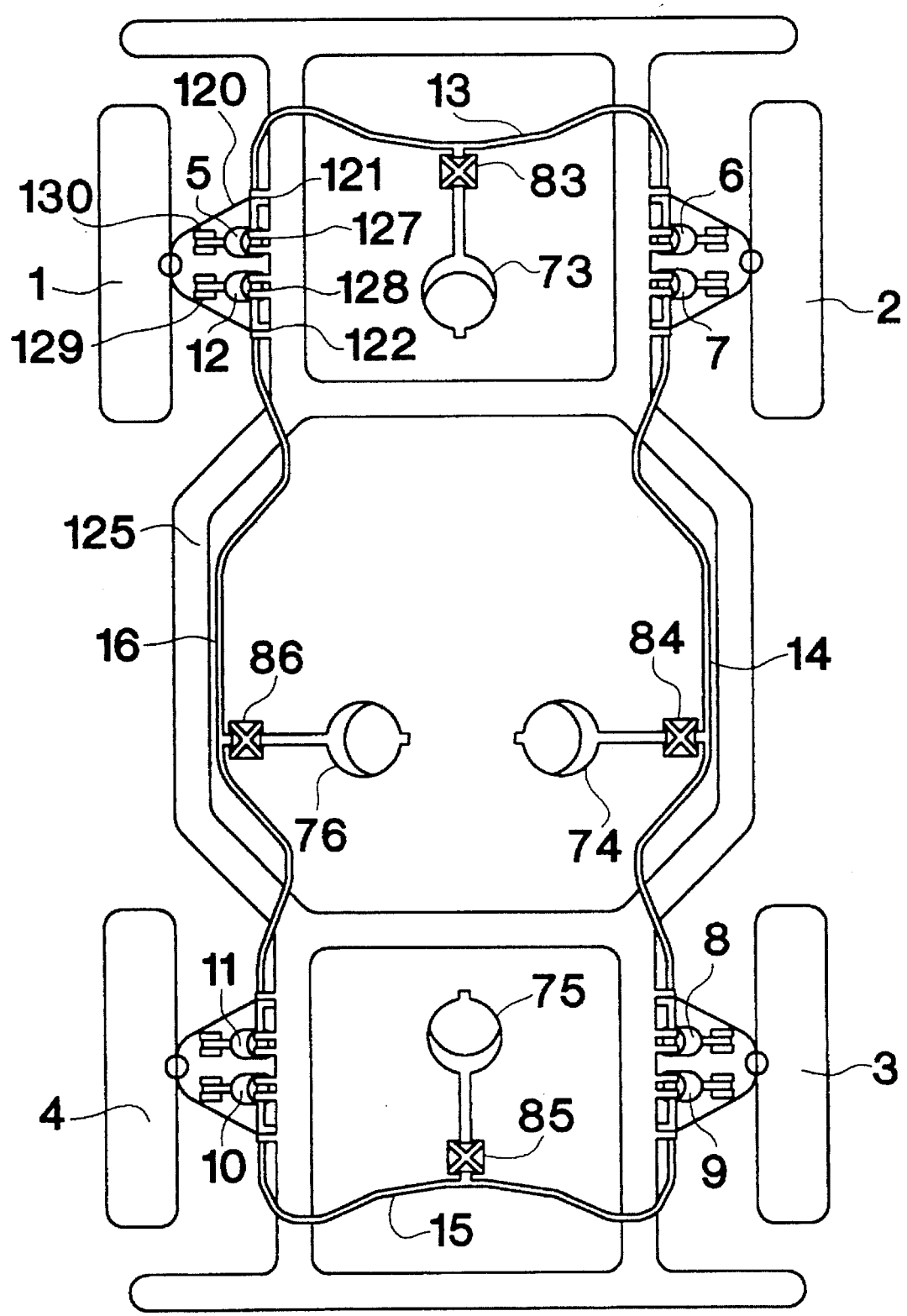
FIG. 1 is a diagrammatic layout of a vehicle chassis and wheel assembly incorporating the proposed suspension system.

Referring now to FIG. 1 of the drawings, which illustrates the suspension system in a fundamentally diagrammatic form. In this drawing, each of the wheels, is mounted on the chassis in the same manner as now described with reference to the front left wheel. The wheel 1, is connected to the chassis by a wishbone type structure 120 which is pivotally connected to the chassis 125 by respective co-axial pivot connections 121 and 122. For the sake of clarity the wishbone type suspension arm 120 and associated pivot connections are identified by reference numeral only in respect of wheel 1 and the remaining three wheels 2, 3 and 4 are identically connected to the chassis 125.

Between the vehicle chassis 125 and each wheel there is provided two single acting cylinders as indicated at 5 and 12, with respect to wheel 1, each pivotally connected to the chassis 125 at 127 and 128 and to the wishbone arm 120 at 129 and 130. The pivot connections at the respective ends of the cylinders 5 and 12 are aligned in the generally longitudinal direction of the chassis 125 whereby as the wheel 1 and the wishbone arm 120 carrying the wheel pivots relative to the chassis 125, each of the cylinders 5 and 12 expand or retract.

The above description with respect to the mounting of the wheel 1 and the interacting pair of cylinders 5 and 12 also applies to the connection of each of the other three wheels of the vehicle, however, for the sake of clarity individual reference numerals for the corresponding components are not shown for each wheel mounting although the respective cylinders on each wheel have been individually identified.

The cylinders 5 and 6, interacting respectively with the front wheels 1 and 2 of the vehicle, are interconnected by the fluid line 13 whilst the cylinders 9 and 10, associated with rear wheels 3 and 4, are interconnected by the fluid line 15. Similarly the cylinders 12 and 11 associated with the front and rear wheels 1 and 4 respectively, are interconnected by the fluid line 16, whilst the front and rear wheels 7 and 8 on the opposite side of the vehicle are interconnected by the fluid line 14.

With the pairs of cylinders arranged as above described between each wheel and the vehicle chassis and interconnected as above described by fluid lines 13, 14, 15 and 16 respectively, a vehicle suspension system is created whereby relative movement in a vertical direction between any one wheel and the chassis 125 will result in a corresponding opposite movement between the transversely opposite wheel and the chassis 125, and between the longitudinally spaced wheel and the vehicle on the same side of the vehicle.

The result of this configuration of inter-communicating hydraulic cylinders is that the vehicle chassis 125 will remain substantially level although its average height thereof with respect to a selected ground datum may vary while all wheels remain in ground contact. It is also important to note that in view of the interconnection of the hydraulic cylinders by the respective hydraulic lines, the pressures in all the cylinders and lines will be substantially the same. Thus the weight transferred from the chassis through the cylinders to each of the wheels will cause effective tractive engagement with the surface upon which the vehicle is supported or moving over.

Each of the fluid lines 13, 14, 15, and 16 are in communication with respective hydraulic accumulators 73, 74, 75 and 76 with respective damping valve 83, 84, 85 and 86 interposed between the respective fluid line and accumulators. Each accumulator is divided in the known manner into two chambers by a movable internal wall. The hydraulic accumulators as illustrated are the common flexible diaphragm type, however, accumulators of other constructions may be used, including piston type, and accumulators using springs or other resilient mechanisms as a substitute for the compressed gas are also acceptable.

The suspension system as described with respect to FIG. 1 of the drawings is the basic suspension system as disclosed in PCT Application AU90/00474 which was laid open to public inspection under International Patent Application No. WO91/04877 and the present invention relates to a further development of that suspension system as will now be described with reference to FIGS. 2 and 3 of the accompanying drawings.

Figure 2:
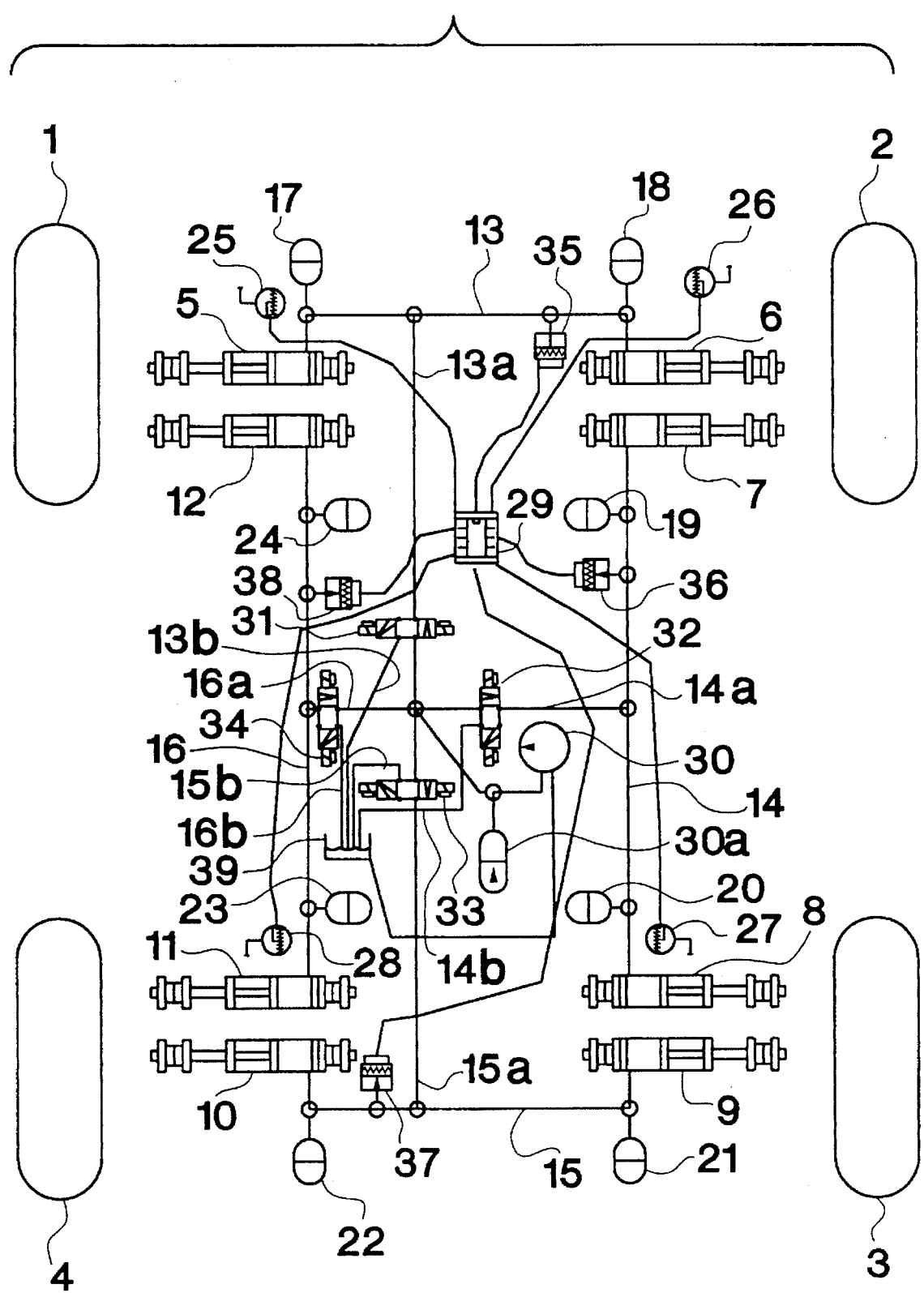
FIG. 2 is a fluid circuit diagram in respect of the invention as applied to the suspension system shown in FIG. 1.

Referring now to FIG. 2, there is shown the hydraulic circuit layout whereby the present invention would be applied to the suspension system as shown in FIG. 1, however, for the sake of clarity, the majority of the mechanical componentary of the vehicle and suspension system has been removed and the hydraulic suspension system and control thereof is shown diagrammatically independent of the mechanical parts. It is however, to be noted that hydraulic components as shown in FIG. 1 and represented in diagrammatic form in FIG. 2, carry the same reference numerals. As described with reference to FIG. 1, each of the wheels 1, 2, 3 and 4 are connected to the vehicle chassis by a respective pair of single acting hydraulic cylinders such as indicated at 5 and 12 in resect of wheel 1. Hydraulic cylinders 5 and 6 of front wheels 1 and 2 are interconnected by the hydraulic line 13 and the rear cylinders 9 and 10 connected to wheels 3 and 4 respectively are interconnected by the rear hydraulic line 15. Similarly, the hydraulic cylinders 11 and 12 of left hand wheels 4 and 1 are interconnected by the hydraulic line 16 and the hydraulic cylinders 7 and 8 of the right hand wheels 2 and 3 are interconnected by hydraulic line 14.

Each of the hydraulic lines has two spaced hydraulic accumulators communicating therewith, such as accumulators 17 and 18 connected to hydraulic line 13; accumulators 19 and 20 connected to hydraulic line 14; accumulators 21 and 22 connected to hydraulic line 15 and accumulators 23 and 24 connected to hydraulic line 16. These accumulators are of the conventional liquid-gas formed with an internal flexible dividing wall whereby the displacement of liquid from any one of the hydraulic circuits into an accumulator will result in compression of the gas in the gas portion of the accumulator. Such accumulators and the construction and operation thereof are well known and will not be further described herein.

Interconnected between the vehicle chassis 125 (not shown in FIG. 2) and the respective wheels 1,2,3 and 4 are individual position sensors 25, 26, 27 and 28 which are arranged to issue a processable signal indicative of the positional relationship in the vertical plane of the wheel with respect to the vehicle chassis. Each of the position sensors 25, 26, 27 and 28 are connected to the programmed controller 29 to respectively supply a signal to the controller indicative of the position of the respective wheel in relation to the vehicle chassis. Alternatively, inclinometers may be attached to each axle as the inclination is directly related to the relative position of the respective wheels.

In addition, each of the hydraulic lines 13, 14, 15 and 16 incorporates a pressure sensor 35, 36, 37 and 38 respectively, each of which supply a signal to the programmable controller 29 indicative of the pressure in the respective hydraulic lines.

The hydraulic pump 30 draws hydraulic fluid from the hydraulic fluid reservoir 39 and may selectively deliver hydraulic fluid to any one of the hydraulic lines 13, 14, 15 and 16 via respective supply lines 13a, 14a, 15a and 16a, each of which incorporates a three position solenoid actuated valve 31, 32, 33 and 34 respectively. Each such solenoid actuated valve is also connected to a respective fluid return line 13b, 14b, 15b and 16b that each terminate at the hydraulic fluid reservoir 39. Accordingly, by actuation of the relevant solenoid valve 13a, 14a, 15a and 16a, fluid can either be delivered by the pump 30 to the respective hydraulic lines 13, 14, 15 and 16, or fluid can be returned from those respective lines to the reservoir 39 or each hydraulic line can be isolated from both the pump 30 and reservoir 39.

It will be appreciated that each of the hydraulic lines 13, 14, 15 and 16 and the respective hydraulic cylinders at each end thereof constitute a closed circuit, that contains a fixed volume of hydraulic fluid. Accordingly if one wheel moves a particular distance in one direction, the wheel at the opposite end of that particular circuit must move an equal distance in the opposite direction, assuming the three way valve in the fluid line to that circuit is closed. Thus, the total of the movement of the two wheels on the one circuit, measured from a common datum will always be the same. Thus, by programming the controller 29 to continually monitor the sum of the position signals from the two position sensors on the respective wheels on the same hydraulic circuit, the controller can determine whether there has been a change in the total amount of fluid in that circuit. Where such a change has been determined by the controller 29, the controller will initiate the operation of the pump 30 of the vehicle is too low, and the opening of the appropriate solenoid valves in the relevant supply lines from the pump to the respective fluid circuits, to add fluid to re-establish the correct total reading from the two position sensors on that one circuit. If the vehicle is too high the appropriate solenoid valve is operated to return fluid to the reservoir 39.

The above discussed operation of the suspension system under the control of the programmed controller 29, ensures that each of the four hydraulic circuits 13, 14, 15 and 16 always contain the correct spacial amount of hydraulic fluid to thereby maintain the correct relationship of each of the wheels with respect to the vehicle body 25.

The above discussed mode of operation of the suspension system as illustrated in FIG. 2 is based on the assumption that there are no pressure accumulators in the respective circuits 13, 14, 15 and 16, however, in an actual vehicle as would be commercially acceptable, pressure accumulators as indicated at 17, 18, 19, 20, 21, 22, 23 and 24 must be provided. The pressure accumulators provide resilience in the suspension system. In view of the basic nature of such accumulators, variations in the load supported by the respective hydraulic circuits 13, 14, 15 and 16 will result in variations in the volume of hydraulic fluid displaced from the circuit into the accumulators coupled to that circuit.

This displacement of fluid into the accumulator is equivalent to a temporary loss or leakage of fluid from the circuit, and will result in a lowering of the vehicle chassis relative to the wheels. This change in relative position of the chassis 125 will be detected by the controller 29 from the input signals from the position sensors, such as for example sensors 25 and 26, and the solenoid valve 31 will be activated to allow the pump 30 to deliver hydraulic fluid to the circuit 13 to correct the positional relation of the chassis 125 to the wheels 1 and 2.

It is to be understood that the control system described herein to correct the positional relation between the vehicle chassis and the supporting wheels does not operate continuously as the vehicle is in motion. The control system proposed is for the purpose of correcting the chassis to wheels positional relationship following a change in the load on the vehicle and/or the distribution of that load. The position sensors and/or the controller normally remain inactive for relatively long periods of time. Typically, the controller and sensors are activated for a short period following each instance of starting the vehicle engine, as typically there is the possibility that while the vehicle was stationary a change in load or load distribution in or/on the vehicle occurred. However, the controller and sensors may be activated at regular time intervals of the order of 5 to 10 minutes while the vehicle is in motion.

The above discussed operation of the controller in processing the information provided by the position sensors enables the controller to correlate the heights of adjacent wheels in both orthogonal direction thus establishes whether the average height of each side or each end of the vehicle is above or below a predetermined prescribed height. This information can optionally be further processed or cross referenced by the controller to determine and confirm whether the front of the vehicle is too high relatively to the back or vice versa and/or whether the vehicle is leaning to the left or right about its longitudinal axis.

If, for example, it is determined that the back end of the vehicle has become too low relative to the front, this change in trim can be a result of various factors and each require a different appropriate response. For example, a heavy load may have been placed at the back of the vehicle and this can easily be determined by measuring the relative pressures in the front and back circuits by way of the pressure sensors 35, 36, 37 and 38 as shown in FIG. 2. If the pressure at the back has increased while the pressure at the front has diminished this would indicate that the load had either shifted from the front towards the rear or that a weight had been added at the back. If a heavy load has been placed towards the rear of the vehicle, the pressure in the rear circuit 15 will increase along with a lesser increase in pressure of the side circuits 14, 16. If the two side circuits 14, 16 have not experienced an increase of pressure this would indicate that the net load had not increased although the centre of gravity of the existing load may have moved backwards on the vehicle.

Also, it is to be understood that the preferred position of the wheels with respect to the vehicle can be different for different operating conditions of the vehicle. Thus, the vehicle chassis would normally be preferably higher when the vehicle is operating off-road or unsealed roads than when operating on sealed roads or highways. Accordingly, the controller can be programmed to permit the operator to select from a range of preset chassis heights which is appropriate to use in the prevailing operating conditions.

In order to determine the optimum relative working volumes and hence pressure of each circuit computer models or empirical experience can define the extreme parameters of loads in different positions and this information is stored be used as a reference.

The parameters can be established as follows:

1. Prescribed ground height of the vehicle in determined with a selected average load, for example, two persons, and with the suspension hydraulic cylinders half extended, that is in the centre of the stroke thereof. In this state, the accumulators should have optimum operating gas volumes to produce a level of resilience for best occupant comfort.

2. The maximum allowable load is placed on the vehicle and in sequence located in the respective extreme position on the vehicle is both the lateral and longitudinal directions. With the weight located in each extreme position, the gas in the associated accumulators will become further compressed and in order to maintain the vehicles at the prescribed attitude, an amount of fluid must be introduced into each hydraulic circuit equal to the change in volume of the gas in the accumulator in that circuit.

3. It is to be noted that dynamic forces resulting from changes of speed or direction are not included in the considerations as the present proposal is only concerned with changes resulting from a change in the static weight distribution or level change.

4. Various level checking and level re-establishment operations or procedures can be adopted but for convenience are described as follows:

a. If four position sensors are used, the information received from the front pair is first added and divided by two to establish the average front height of the vehicle.

b. The information from the two rear position sensors is similarly then added and averaged to establish the average rear height of the vehicle.

c. A comparison is made of the average height of the front versus the rear to establish if one end has gone up or down relative to the other and/or whether there is a net increase or decrease in vehicle height.

d. If the net height remains correct but for example the back has subsided and the front has gone up, the pump 30 is activated while the three way solenoid valve 33 is opened between the pump and rear circuit 15, so that fluid is introduced into the rear hydraulic circuit to raise the rear of the vehicle.

e. The three way solenoid valve 31 between the front circuit 13 and the tank 39 is opened to release some fluid from the front circuit so that as the back is pumped up the front is allowed to lower.

f. When the fore and aft attitude is approximately correct, the pressures of the two side circuits 14 and 16 is monitored from the pressure sensors 36, 38 to establish how much weight is being borne on the side circuits.

g. This is then compared with data relating to pressure received from the front and rear pressure sensors 35,37 so that if the transverse pair are over or under pressurised fluid can be introduced or removed from the appropriate circuit.

h. The information from the height sensors is then compared to establish whether the average height of the left side relative to the right side is within the predetermined parameters, and if any adjustment is necessary, this is achieved by returning fluid to the tank 39 from the vehicles high side and introducing a similar amount of fluid to the low side via the pump 30 until the level lateral attitude is reached.

i. If any adjustments such as described in h. were made, then the entire sequence a. to h. should be rechecked in the event that the other initial heights and pressures have become modified during the process.

It should be noted that while the above has been described as a sequence of events all these steps may occur more or less concurrently so that the attitude change is seen to be a single operation with various solenoids opening and closing while the pump is in action.

If the attitude can not be corrected within the normally permitted parameters or pressures in the various circuits, because for example an extreme load has been applied asymmetrically, then new references are progressively selected and the process is repeated until a satisfactory relationship of heights and pressures is achieved.

The general rule is that if one end is heavily laden and shows a significant pressure increase relative to the other end then the two side circuits between the front and rear should both adopt a pressure roughly equivalent to the average of the two extreme circuits. This ensures that the weight distribution is as uniform as possible in the two cylinders of each wheel. Similarly the average of the front and rear circuits pressure should be roughly equivalent to the average pressure of the two side circuits. This rule is only approximate as each vehicle has its own weight distribution parameters such as the hydraulic cylinders may have different bore sizes leading to different pressure differentials and fluid capacities.

Figure 3:
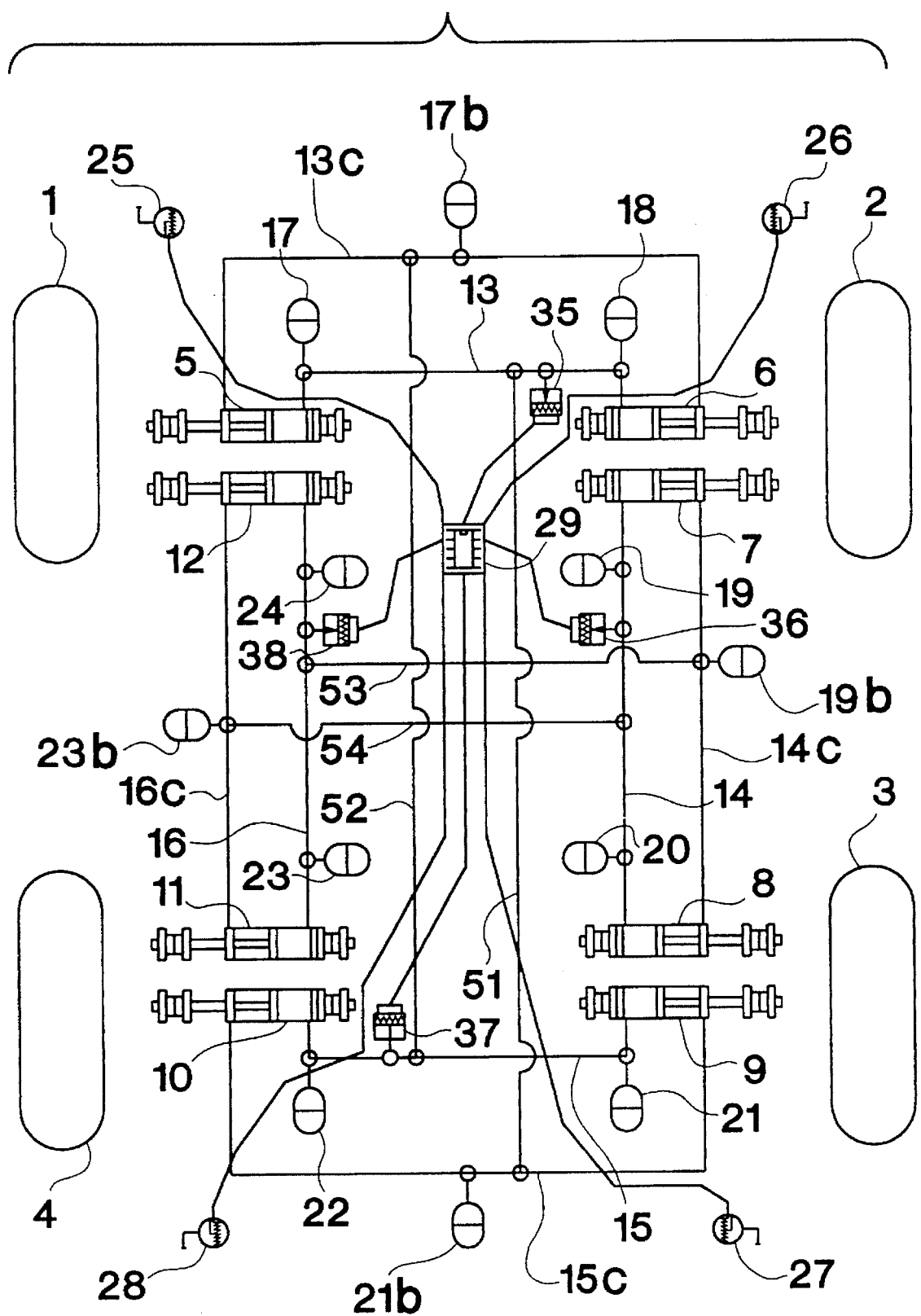
FIG. 3 is a fluid circuit diagram of a first modification of the suspension system shown in FIG. 2.

Referring now to FIG. 3 of the drawings, there is shown the same basic vehicle and hydraulic system as previously described with respect of FIGS. 1 and 2 and corresponding components in FIG. 3 carry the same reference numeral as in FIGS. 1 and 2. However, in the constructions shown in FIG. 3, each of the hydraulic cylinders connected between the respective wheels and the vehicle chassis, are double acting cylinders. The upper chambers of each of the double acting cylinders are interconnected in the manner as previously described with reference to FIG. 2 and the relevant interconnecting hydraulic circuits carry the same reference numeral as in FIG. 2, namely 13, 14, 15 and 16. In addition, the lower end chambers of each of the double acting hydraulic cylinders is interconnected in the identical manner to the upper chambers and are respectively identified by reference numerals 13c, 14c, 15c and 16c.

The other principle difference between the construction shown respectively in FIGS. 2 and 3 is that hydraulic circuit 13 at the front of the vehicle is connected by the hydraulic line 51 to hydraulic circuit 15c at the rear of the vehicle, whilst hydraulic circuit 13c at the front is connected by hydraulic line 52 to the hydraulic circuit 15 at the rear of the vehicle. Similarly, the hydraulic circuits on the respective sides of the vehicle chassis are similarly interconnected in that the left side hydraulic circuit 16 is connected to the right side hydraulic circuit 14c by the hydraulic line 53 and the lower hydraulic circuit 16c at the left hand side of the vehicle is connected to the upper hydraulic circuit 14 on the right hand side of the vehicle by the hydraulic line 54.

The construction of the suspension system as shown in FIG. 3 is described in greater detail in the Applicant's PCT Application constituting International Patent Application No. WO93/01063, the disclosure of which is incorporated herein by reference. Further, the hydraulic circuits 13, 14, 15 and 16 are connected to a pump and reservoir of the same construction and in the same manner as previously described with respect to FIG. 2. That is, a pump and tank such as pump 30 and tank 39 in FIG. 2 are incorporated into the suspension system in FIG. 3 with the same configuration of three way solenoid valves and fluid conduits 13a, 14a, 15a and 16a in FIG. 2 incorporated into FIG. 3. This arrangement of the pump, fluid tank, solenoid valves and conduits operates in the identical manner to that previously described with respect to FIG. 2 and the description shall not be repeated here with respect to FIG. 3.

It is to be noted that although the circuits 13, 14, 15 and 16 connected between the upper chambers of the respective double acting cylinders, are in constant communication with the lower line on the opposite side or end of the vehicle as above described, this does not adversely affect the height adjustment of the vehicle chassis by way of supplying or withdrawing fluid from the circuits 13, 14, 15 and 16 since the upper chambers of the respective double acting cylinders have the dominant influence on the trim of the vehicle chassis with respect to the ground engaging wheels.

In the preceding descriptions of the respective embodiments of the invention, as illustrated in the accompanying drawing, specific reference has been made to hydraulic systems providing the supporting connection between the wheels and the vehicle body or chassis and it is to be understood that pneumatic or other fluid systems can equally be used within the scope of the invention as herein described.

Figure 4:
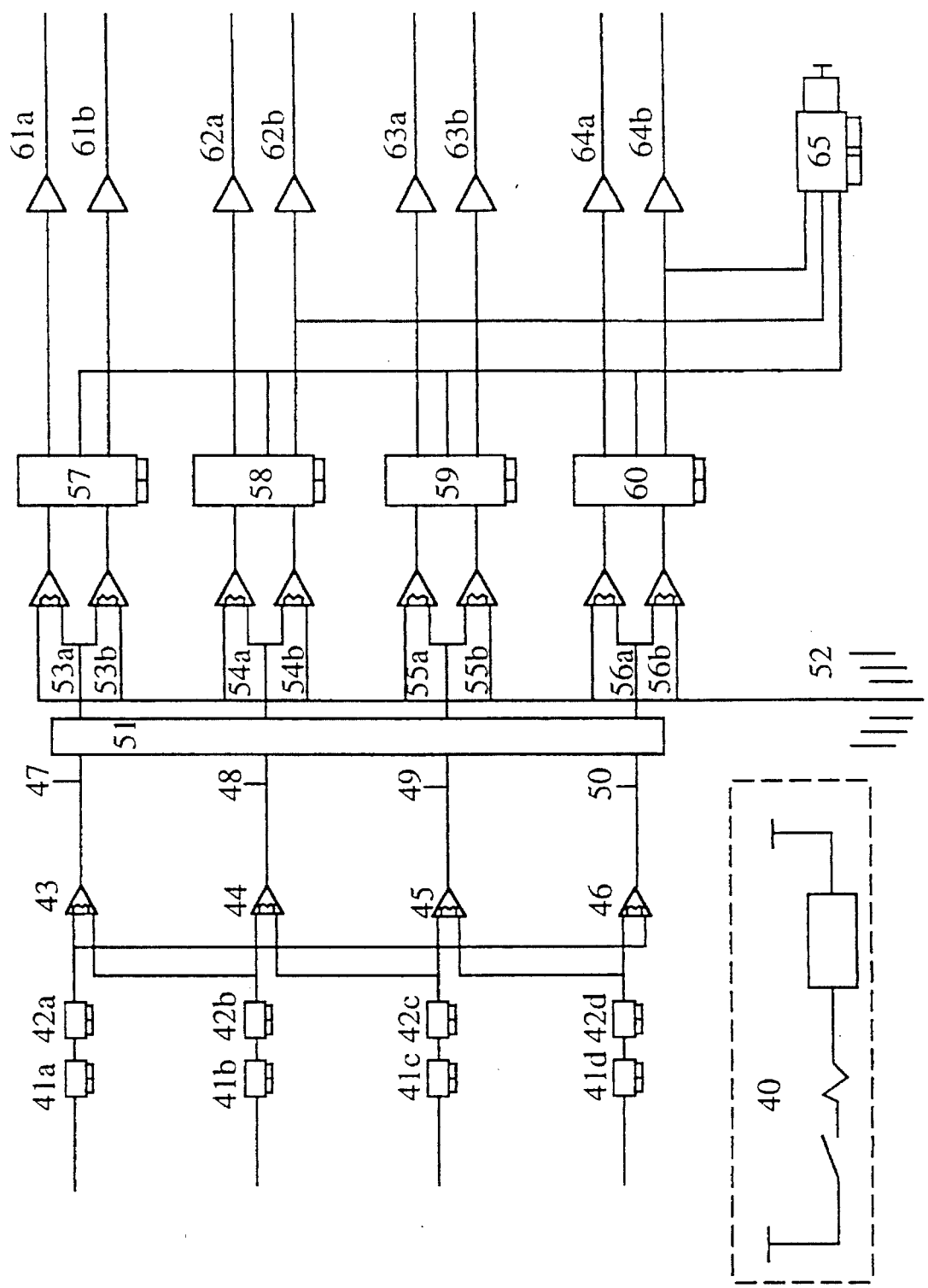
FIG. 4 is a logic diagram of the operation of the controller.

FIG. 4 depicts diagrammatically the internal operations of the programmed controller illustrating the processing of the information received from the wheel position sensors and the pressure sensors to trigger the operation of solenoid valves to achieve the desired predetermined fluid condition in the respective fluid circuits.

In order for the controller 29 to be universal in its fitment it is equipped with a power supply adaptor 40 that converts the vehicles power supply to a voltage acceptable to the controller.

The information from the wheel position and pressure sensors is received into the input buffers for each wheel 41*a* front left, 41*b* front right, 41*c* back right and 41*d* back left where the information is stored. At this point there is an adjustment for setting a zero reading of each system so as to gain a datum point from where to work. Items 42*a*, 42*b*, 42*c* and 42*d* are span adjusters to set the width of field of operation to either side of the set zero. The information is then passed to summers where it is added and divided in pairs to get an average of two wheels to indicate the average wheel height and/or pressure of each circuit. Item 43 averages front left and front right wheels to obtain the front system as 44 does front right and back right for the right system, 45 back right and back left for the back system and 46 back left and front left for the left system.

At this point there is an allowance for a take off (47, 48, 49, 50) to supply other equipment (indicators, data logger, memory storage etc) with the information thus far gained.

The sequencing device 51 allows information to be processed in a predetermined order (or simultaneously) as specified for the particular vehicles requirements.

The information is then compared (via selector 52) to one of any number of pre-set values. The comparators do an 'if greater than then' or 'if less than then' scenario to each system at 53*a* and 53*b*, 54*a* and 54*b*, 55*a* and 55*b* and 56*a* and 56*b* respectively. An adjustable time delay (57, 58, 59, 60) is used to control the delay before acting and the length of time acted upon for each of the solenoids to rectify the difference in the fluid volume and/or pressure in the particular circuit. For systems fitted with pressure regulators on the side circuits, a reset button 65 is incorporated with a time equalisation adjustment to give the regulators time to supply enough fluid volume to reach their pre-set pressure before the solenoids are turned off by the time delay.

Each circuit supply and return solenoids or other fluid valving devices are then switched via a driver or other electrical or mechanical device; 61*a* front down, 61*b* front up, 62*a* right down, 62*b* right up, 63*a* back down, 63*b* back up, 64*a* left down and 64*b* left up.

It will be appreciated that the controller can take many forms and be programmed to receive inputs relating to other areas of the vehicle operation. However, it is to be understood that the controller does not function in a manner analogist to an active suspension. More particularly, the present invention is directed to adjusting the suspension system to correct the changes in the load and/or load distribution and not changes in the road or terrain being traversed.

I claim:

1. A vehicle suspension system comprising a plurality of wheel assemblies arranged in longitudinal and lateral spaced relation to a vehicle body, each wheel assembly including a wheel and first and second fluid rams each operably connected between the wheel and the vehicle body to support the vehicle body, the first fluid ram of each two laterally spaced wheel assemblies being in direct fluid communication by respective lateral fluid circuits, and the second fluid rams each being double acting fluid rams having upper and lower chambers, said double acting second fluid rams of the respective longitudinally spaced wheel assemblies on each side of the vehicle having the respective upper chambers thereof in direct fluid communication and the respective lower chambers thereof in direct fluid communication by respective upper and lower longitudinal conduits the respective upper longitudinal conduits on the respective sides of the vehicle being in direct fluid communication with the respective lower longitudinal conduit on the opposite side of the vehicle, sensor means adapted to generate signals indicative of the positional relations of each of said laterally and longitudinally spaced wheels relative to the vehicle body, control means arranged to receive said signals and compare said positional relations with a respective preset datum position, and adjustment means operable in response to variation of the positional relation of each wheel from the respective datum position beyond a preset limit to adjust the volume of fluid in the lateral and longitudinal fluid circuits to establish a positional relation within said preset limit.

2. A vehicle suspension system as claimed in claim 1, wherein means are provided to maintain a predetermined pressure relation between the pressure of the fluid in the lateral conduits connecting the laterally spaced fluid rams and the pressure of the fluid in the longitudinal conduits connecting the longitudinally spaced fluid rams.

3. A vehicle suspension as claimed in claim 1, wherein means are provided to maintain a predetermined pressure in the upper chambers of the communicating longitudinally spaced fluid rams.

4. A vehicle suspension system as claimed in claim 1, wherein said control means is adapted to receive said signals from the sensor means and to independently compare the positional relation of the front and rear wheels with respect to respective datum positions, and said adjustment means being operable to individually adjust the volume of fluid in the lateral and longitudinal fluid circuit.

5. A vehicle suspension system as claimed in claim 1, wherein the control means is adapted to determine from the signals from the sensor means the average height of each of the front and rear ends of the vehicle and of the respective opposite sides of the vehicle, and to compare said average heights with respective pre-selected average heights and to activate the adjustment means to re-establish a pre-selected average height of the front and rear ends and each side of the vehicle.

6. Vehicle suspension system as claimed in claim 5, wherein the control means is adapted to activate the adjustment means to effect the adjustment to the front and rear height of the vehicle and to sequentially effect the adjustment to the height of the respective sides of the vehicle.

7. A vehicle suspension system as claimed in claim 1, wherein the first fluid rams are double acting fluid rams having upper and lower chambers, said first double acting fluid rams of the laterally spaced wheel assemblies having the respective upper chambers thereof in direct fluid communication and the respective lower chambers thereof in direct fluid communication by respective upper and lower lateral conduits forming the lateral fluid circuits, said upper lateral conduits on the respective ends of the vehicle being in direct fluid communication with the lower conduit at the opposite end of the vehicle.

8. A vehicle suspension system as claimed in claim 7, wherein means are provided to maintain a predetermined pressure relation between the pressure of the fluid in the lateral conduits connecting the laterally spaced fluid rams and the pressure of the fluid in the longitudinal conduits connecting the longitudinally spaced fluid rams.

9. A vehicle suspension as claimed in claim 7, wherein means are provided to maintain a predetermined pressure in the upper chambers of the communicating longitudinally spaced fluid rams.

10. A vehicle suspension system as claimed in claim 7, wherein said control means is adapted to receive said signals from the sensor means and to independently compare the positional relation of the front and rear wheels with respect to respective datum positions, and said adjustment means being operable to individually adjust the volume of fluid in the lateral and longitudinal fluid circuit.

11. A vehicle suspension system as claimed in claim 7, wherein the control means is adapted to determine from the signals from the sensor means the average height of each of the front and rear ends of the vehicle and of the respective opposite sides of the vehicle, and to compare said average heights with respective pre-selected average heights and to activate the adjustment means to re-establish a pre-selected average height of the front and rear ends and each side of the vehicle.

12. A vehicle suspension system as claimed in claim 11, wherein the control means is adapted to activate the adjustment means to effect the adjustment to the front and rear height of the vehicle and to sequentially effect the adjustment to the height of the respective sides of the vehicle.

13. A vehicle suspension system comprising a plurality of wheel assemblies arranged in longitudinal and lateral spaced relation to a vehicle body, each wheel assembly including a wheel and first and second fluid rams each operably connecting the wheel to the vehicle body to support the vehicle body, the first fluid ram of each two laterally spaced wheel assemblies of said plurality of wheel assemblies being in direct fluid communication by lateral fluid circuits, and each second fluid ram of each two longitudinally spaced wheel assemblies on the same side of the vehicle being in direct fluid communication by longitudinal fluid circuits, sensor means adapted to generate signals indicative of the positional relations of each of said laterally and longitudinally spaced wheels relative to the vehicle body, control means arranged to receive said signals and compare said positional relations with a respective preset datum position, and adjustment means operable in response to variation of the positional relation of each wheel from the respective datum position beyond a preset limit to adjust the volume of fluid in the lateral and longitudinal fluid circuits to establish a positional relation within said preset limit, wherein the second fluid rams are double acting fluid rams, each having upper and lower chambers, said double acting second fluid rams on the same side of the vehicle having the respective upper chambers thereof in direct fluid communication and the respective lower chambers thereof in direct fluid communication by respective upper and lower longitudinal conduits, the upper conduits on the respective sides of the vehicle being in direct fluid communication with the lower conduit on the opposite side of the vehicle, and wherein the first fluid rams are double acting fluid rams having upper and lower chambers, said double acting first fluid rams of the laterally spaced wheel assemblies having the respective upper chambers thereof in direct fluid communication and the respective lower chambers thereof in direct fluid communication by respective upper and lower lateral conduits, said upper lateral conduits on the respective ends of the vehicle being in direct fluid communication with the lower lateral conduit at the opposite end of the vehicle.

14. A vehicle suspension system as claimed in claim 13, wherein means are provided to maintain a predetermined pressure relation between the pressure of the fluid in the conduits connecting the laterally spaced fluid rams and the pressure of the fluid in the conduits connecting the longitudinally spaced fluid rams.

15. A vehicle suspension as claimed in claim 13 wherein means are provided to maintain a predetermined pressure in the upper chambers of the communicating longitudinally spaced fluid rams.

16. A vehicle suspension system as claimed in claim 13 wherein said control means is adapted to receive said signals from the sensor means and to independently compare the positional relation of the longitudinally spaced wheels with respect to respective datum positions, and said adjustment means being operable to individually adjust the longitudinal volume of fluid in the fluid circuits the longitudinally spaced wheels respectively.

17. A vehicle suspension system as claimed in claim 13 wherein the control means is adapted to determine from the signals from the sensor means the average height of each of the front and rear ends of the vehicle and of the respective opposite sides of the vehicle, and to compare each average heights with respective pre-selected average heights and to activate the adjustment means to re-establish a pre-selected average height of the front and rear ends and each side of the vehicle.

18. A vehicle suspension system as claimed in claim 17 wherein the control means is adapted to activate the adjustment means to effect the adjustment to the front and rear height of the vehicle and to sequentially effect the adjustment to the height of the respective sides of the vehicle.

* * * * *